Jan. 1, 1924 1,479,257
H. T. SCHERMERHORN
CHECK WRITER
Filed Nov. 17 1922 4 Sheets-Sheet 2
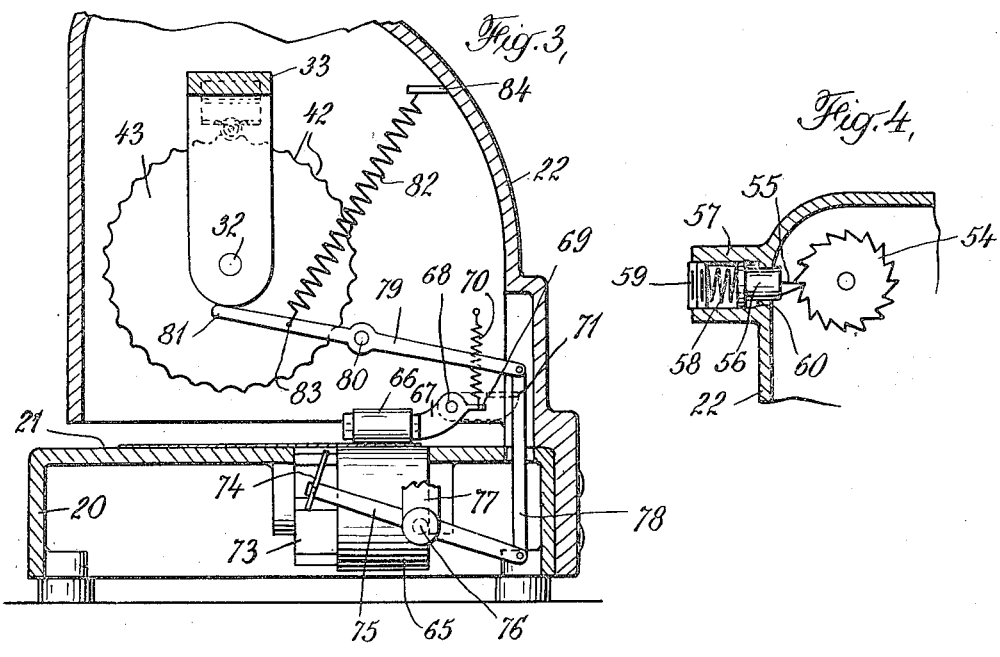
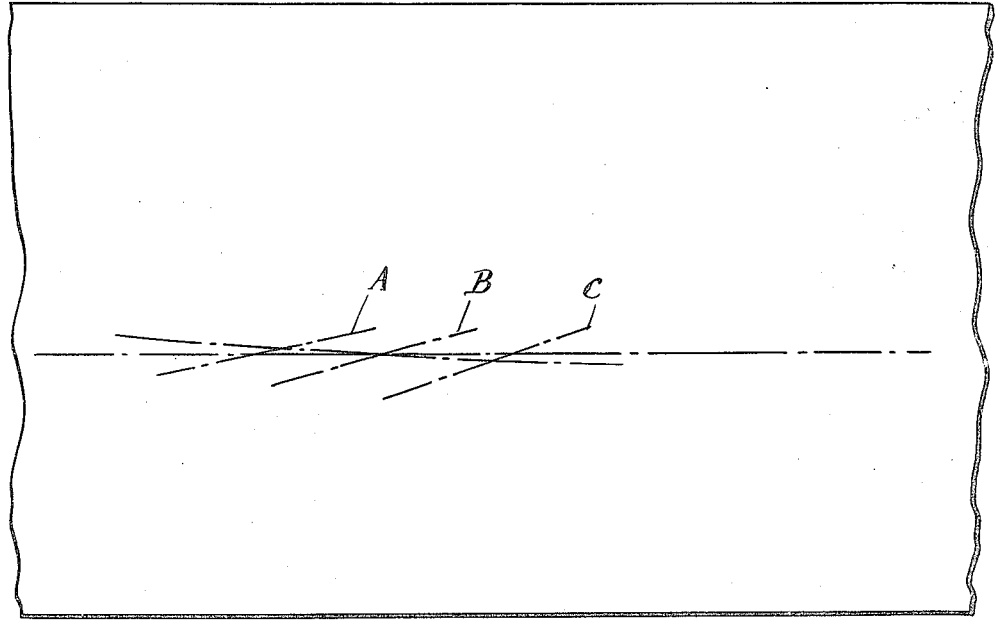
Fig. 5,
INVENTOR
Harry T. Schermerhorn
BY E. W. Marshall
ATTORNEY INVENTOR
Harry T. Schermerhorn
BY E. W. Marshall
ATTORNEY Jan. 1, 1924 — H. T. SCHERMERHORN — 1,479,257
CHECK WRITER
Filed Nov. 17, 1922 — 4 Sheets-Sheet 4
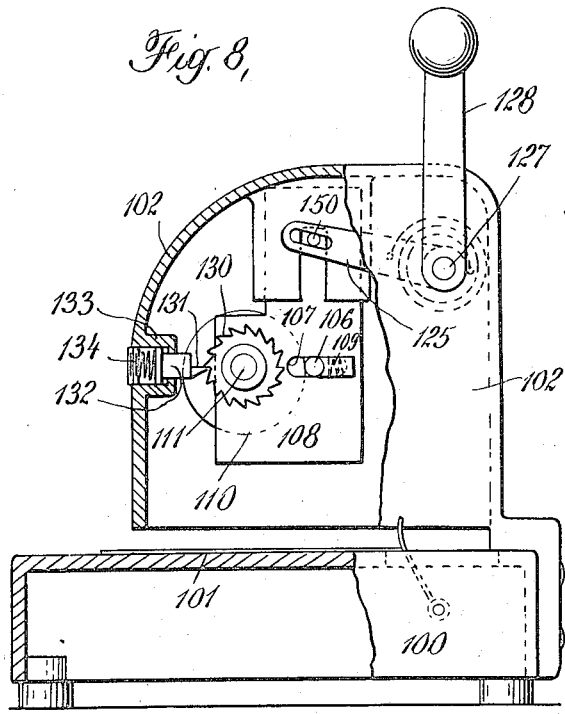
Fig. 8,
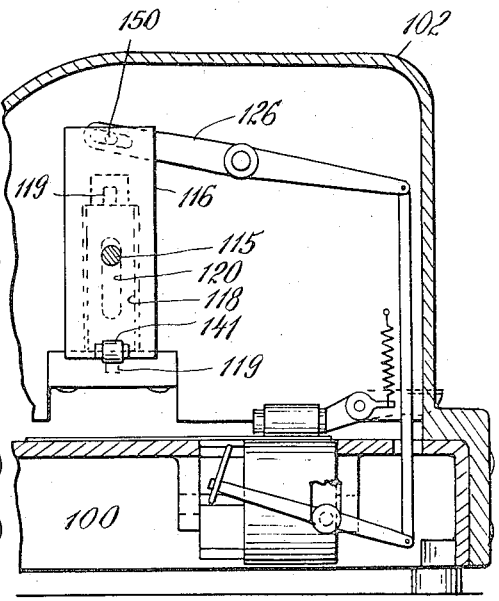
Fig. 9,
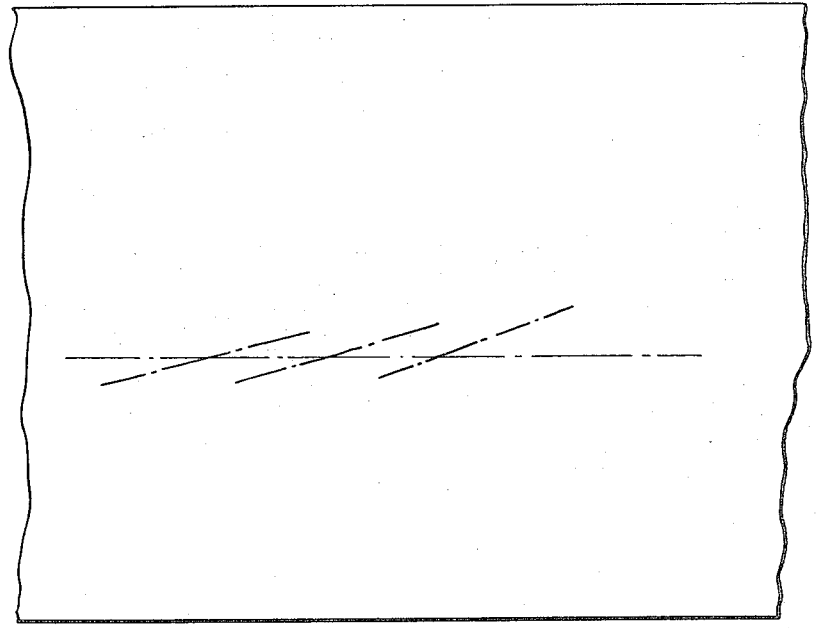
Fig. 10,
INVENTOR
Harry T. Schermerhorn
BY E. W. Marshall
ATTORNEY Patented Jan. 1, 1924.

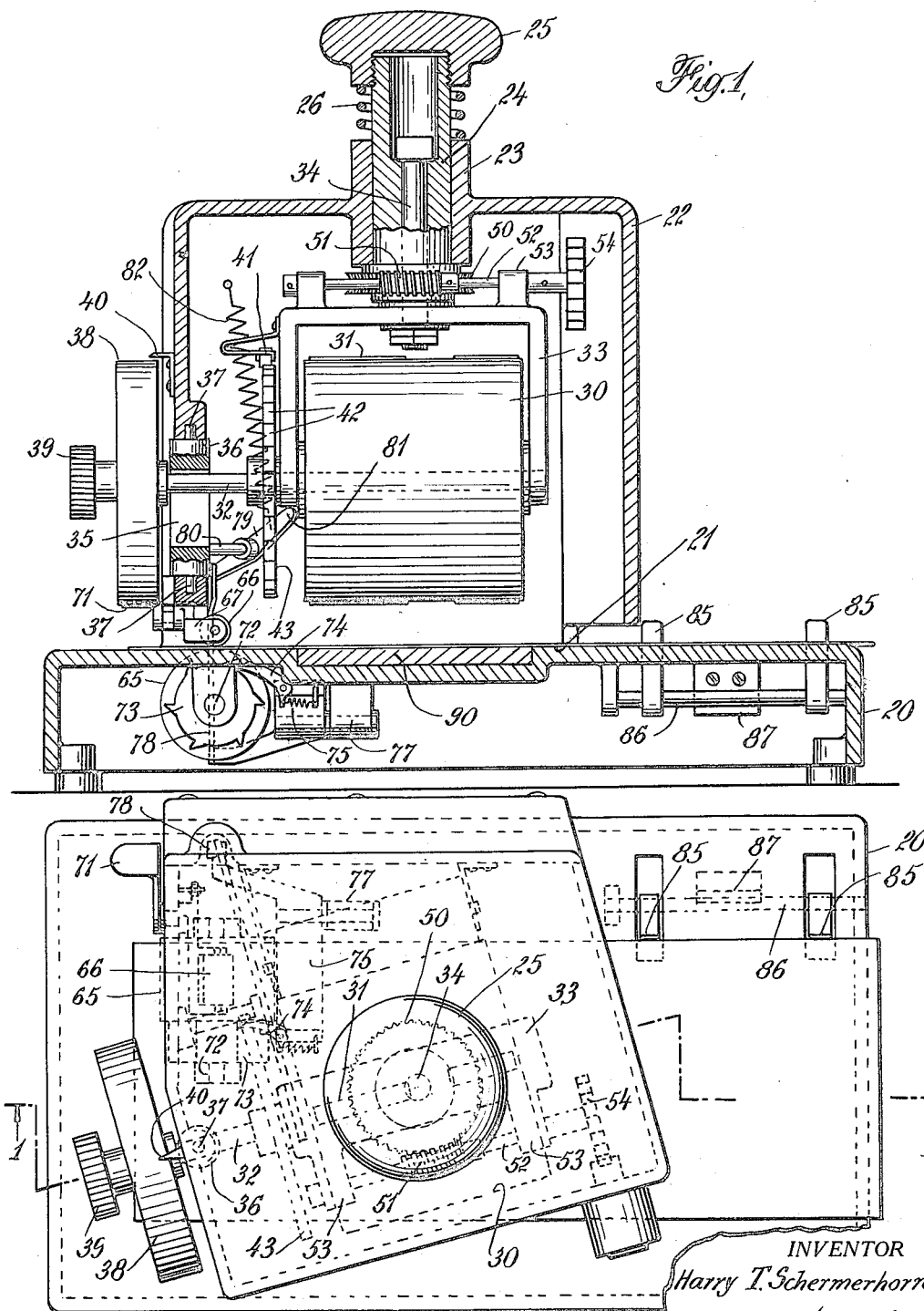

1,479,257

UNITED STATES PATENT OFFICE.

HARRY T. SCHERMERHORN, OF HAWTHORNE, NEW JERSEY.

CHECK WRITER.

Application filed November 17, 1922. Serial No. 601,625.

*To all whom it may concern:*

Be it known that I, HARRY T. SCHERMERHORN, a citizen of the United States, and a resident of Hawthorne, county of Passaic, and State of New Jersey, have invented certain new and useful Improvements in Check Writers, of which the following is a specification.

This invention relates to safety check writing devices.

There are many forms of check writers now in use by means of which the amount of money for which the check is drawn is impressed in or printed on the body of the check either by figures, words, or both. In all of these devices, however, so far as is known the marks on the check indicating the amount thereof are made in a straight line or in parallel lines and such location of the impressions or marks facilitates "raising" the check since if the position of the check when a certain mark or impression is made is noted or fixed in some way, the impression or mark can be voided or removed by pressure on the check paper or in some other manner and the check can be replaced in the machine in the same position as when the impression was made. A new impression can then be made indicating a larger amount than the first amount indicated. As a matter of fact, such changes have actually been made.

This invention has for its salient object to provide a check writer so constructed and arranged as to render difficult or impossible the alteration of a check written by the device.

Another object of the invention is to provide a check writer so constructed and arranged that each successive operation of the device will make an impression or mark on the check irregularly disposed with reference to the preceding impression or mark.

Another object of the invention is to provide a check writer or protector so constructed and arranged that each operation of the device will effect relative angular movement between the check and the indicia on the writing device whereby no two successive impressions will be disposed parallel or in alinement with each other.

Another object of the invention is to provide a check writer so constructed and arranged that the axis of the type or impression roll will be angularly adjusted upon each actuation of the device.

Further objects of the invention will appear from the following specification taken in connection with the drawings, which form a part of this application, and in which Fig. 1 is a sectional elevation illustrating one form of check writer constructed in accordance with the invention and taken substantially on line 1—1 of Fig. 2.

Fig. 2 is a top plan view of the construction shown in Fig. 1.

Fig. 3 is a transverse sectional elevation of the construction shown in Fig. 1.

Fig. 4 is a detailed sectional elevation showing a ratchet wheel carried by the yoke of the impression device.

Fig. 5 is a plan view of a portion of a check showing the relative angularity of the successive impressions on the check.

Fig. 8 is a sectional elevation taken substantially on line 8—8 of Fig. 7.

Fig. 9 is a sectional elevation taken substantially on line 9—9 of Fig. 7, and

Fig. 10 is a top plan view of a portion of a check having thereon indicia or impressions made by the device illustrated in Figs. 6 to 9 inclusive.

Figure 6:
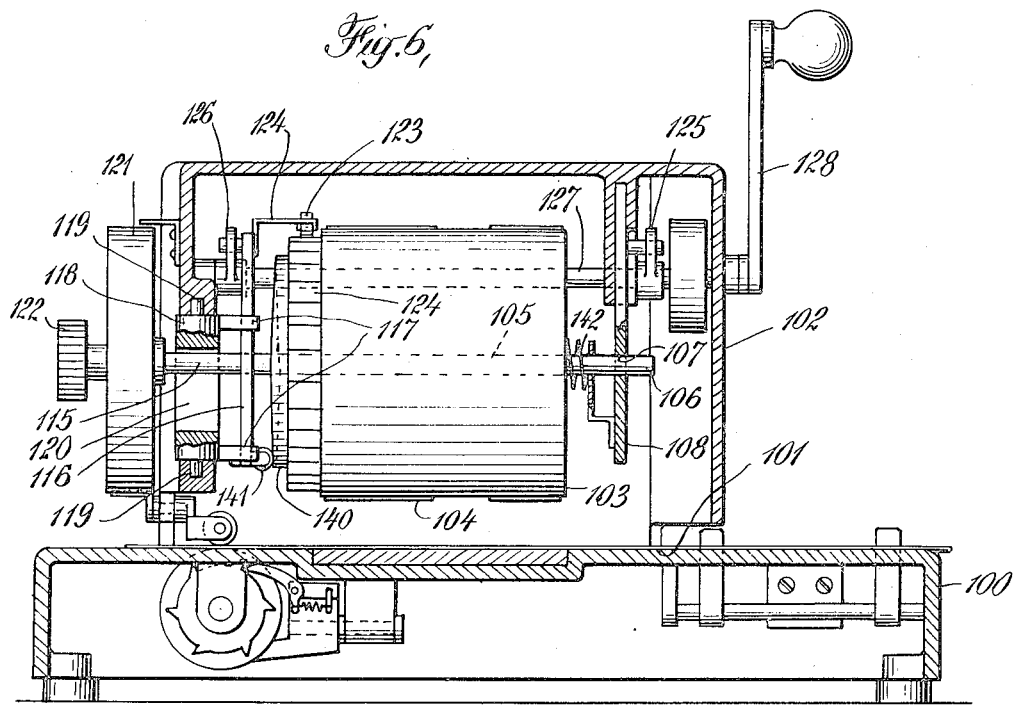
Fig. 6 is a sectional elevation similar to Fig. 1, but illustrating another form of check writer constructed in accordance with the invention, this view being taken substantially on line 6—6 of Fig. 7.

The invention briefly described consists of a check writer comprising means for supporting a check, an impression device movable into engagement with the check and having thereon indicia for impressing or marking on the check the amount thereof and means operable upon each actuation of the impression device for effecting relative angular movement between the impression device and the check whereby no two successive impressions on the check will be disposed parallel or in alinement with each other. In the particular forms of the invention illustrated the impression device includes a roll and the axis of this roll is angularly moved upon each actuation of the impression device, successive angles of movement causing corresponding angles between successive impressions on the check. In one form of the invention means is provided for shifting the roll longitudinally when the roll is rotated to bring the desired indicia to operative position. Further details of the invention will appear from the following description.

Referring to the drawings and particularly to the form of the invention shown in Figs. 1 to 4 inclusive, the check writer comprises a base 20, having an upper surface 21 for supporting the check, and a casing 22 secured to the base and extending over the base, this casing housing the impression device.

As shown in Fig. 1, the casing 22 has formed therein a vertically extending bearing 23 and in this bearing there is mounted a sleeve 24, the sleeve being vertically reciprocable and rotatable in the bearing 23. A handle 25 is secured to the upper end of the sleeve 24 and a spring 26 is interposed between the upper end of the bearing 23 and the handle and normally retains the sleeve and handle in the position shown in Fig. 1.

The impression device comprises a roll 30 having indicia or type 31 on the periphery thereof and the roll is carried by a shaft 32 which in turn is mounted in a yoke 33 supported by a bolt 34 secured, as shown in Fig. 1, eccentrically to the sleeve 24.

The shaft 32 extends at one end through the yoke 33 and through a slot 35 in a barrel 36 pivoted on vertical pivots 37 to one side of the casing 22. The end of the shaft 32 is disposed outside of the casing and has mounted thereon a disk 38 having indicia thereon corresponding to the indicia 31 on the roll 30 and a handle 39 is secured to the disk or to the shaft for facilitating the rotation of the disk, shaft and roll when the roll is adjusted. A pointer 40 is mounted on the casing 22 adjacent the periphery of the disk 38 to indicate the indicia on the disk and roll. The roll is retained in adjusted position by a spring-pressed roller 41 mounted on the yoke 33 and engageable with annular depressions 42 formed in a disk 43 secured to the shaft 32.

The mechanism for angularly displacing the axis of the roll 30 will now be described. This mechanism comprises a worm gear 50 secured to the sleeve 24 and a worm 51 carried by a shaft 52 mounted in brackets 53 fixed to the yoke 33, the worm 51 meshing with the worm gear 50. Means is provided for rotating the shaft 52, worm 51 and worm gear 50 upon each actuation of the impression device. This is accomplished by a ratchet wheel 54 secured to one end of the shaft 52 (see Figs. 1 and 4) and engageable by a pawl 55 formed on a cylindrical stud 56 slidably mounted in an extension 57 of the casing 22. A spring 58 normally presses the stud and pawl toward the ratchet wheel 54 and attention is called to the fact that a clearance is provided between the head 59 of the stud 56 and the wall 60 of the casing 22.

The operation of the impression device will now be briefly outlined. When pressure is exerted on the handle 25, the sleeve 24 will be forced downwardly in the bearing 23 and will carry with it the yoke 33 and impression roll 30. When these parts move downwardly the ratchet wheel 54 will be rotated since this wheel will move downwardly with the yoke and the pawl 55 is fixed against vertical movement. As the ratchet wheel 54 is rotated, the worm 51 and worm gear 50 will also be rotated, thereby causing rotation of the sleeve 24. When the sleeve rotates, the bolt 34 will be eccentrically rotated relative to the sleeve and due to this eccentric rotation, the yoke 33, shaft 32 and impression roll 30 will also be angularly displaced, angular movement of the shaft 32 being permitted by the swivel mounting of this shaft in the barrel 36.

Any suitable means may be provided for feeding the check longitudinally on the support after an impression has been made thereon and in the form of the invention illustrated in Figs. 1 to 4 this is accomplished in the following manner. A feed roll 65 is rotatably mounted in the base 20, and, as shown in Fig. 3, this roll extends through an opening in the upper surface 21 of the base 20 and has its periphery so disposed as to engage the under surface of a check mounted on the base supporting surface. A pressure roll 66 is carried by an arm 67 mounted on a spindle 68 which extends through the wall of the casing 22. The arm 67 has an extension 69 on the opposite side of the spindle 68 and this extension is engaged by a spring 70 which forces the pressure roll 66 in a direction toward the feed roll 65. A handle 71 is secured to the spindle 68 outside of the casing 22 for the purpose of lifting the pressure roll 66 when a check is to be inserted in the device.

The feed roll is actuated as follows. This roll 65 is mounted on a shaft 72 and on the shaft is secured a ratchet wheel 73 engageable by a spring-pressed pawl 74. The pawl 74 is carried by a lever arm 75 pivoted at 76 on a lug 77 formed in the base 20 and the end of the lever 75 opposite the pawl is connected by a link 78 to a lever 79 pivoted at 80 to the casing 22. The end of the lever 79 opposite the link connection is disposed, as shown at 81, in engagement with the lower end of the yoke 33 and is held in engagement therewith by a spring 82 connected at 83 to the lever and at 84 to the casing 22.

The check feeding mechanism just described operates as follows. Upon each actuation of the impression device and yoke, the lever 79 will be swung on its pivot, thereby swinging the lever 75 on its pivot. As the lever 75 is swung the pawl 74 will be carried around a portion of the periphery of the ratchet 73 and will snap over the ratchet teeth. As the yoke and impression device return to their raised position, the levers will be moved in the opposite direction and the pawl will rotate. The ratchet will thereby feed the check.

Guide fingers 85 extending upwardly through the upper surface 21 of the base 20 may be provided for positioning the check. In the particular form of the invention illustrated, these fingers are carried by a spindle 86 and the spindle is retained in any position of adjustment by a friction plate 87 secured to the base and engaging the spindle.

The check writer above described operates as follows. The pressure roll 60 is first raised and the check is inserted between the pressure roll and feed roll in a position below the impression device. The roll 30 is then rotated to the desired position of adjustment ascertained by watching the pointer 40 and disk 38. After the roll has been properly set, pressure is exerted on the handle 25, thereby forcing the impression device into contact with the check. In Fig. 1 a platen 90 of any suitable construction is illustrated as mounted in the upper surface of the base in a position below the impression roll 30. When the impression device is depressed, the ratchet wheel 54 will be rotated in the manner hereinbefore described, thereby causing the angular displacement of the roll 30 and it should be noted that this angular displacement takes place upon each actuation of the impression device. Fig. 5 illustrates the effect of this angular displacement on the impressions or marks on the check. From this showing it will be seen that impression A is angularly disposed with reference to the impression B and the impression C is also angularly disposed with reference to the impression B. It will be obvious, therefore, that because of the relative angularity of the successive impressions it would be impossible to raise a check by voiding one impression and superimposing a second impression covering a different amount.

Figure 7:
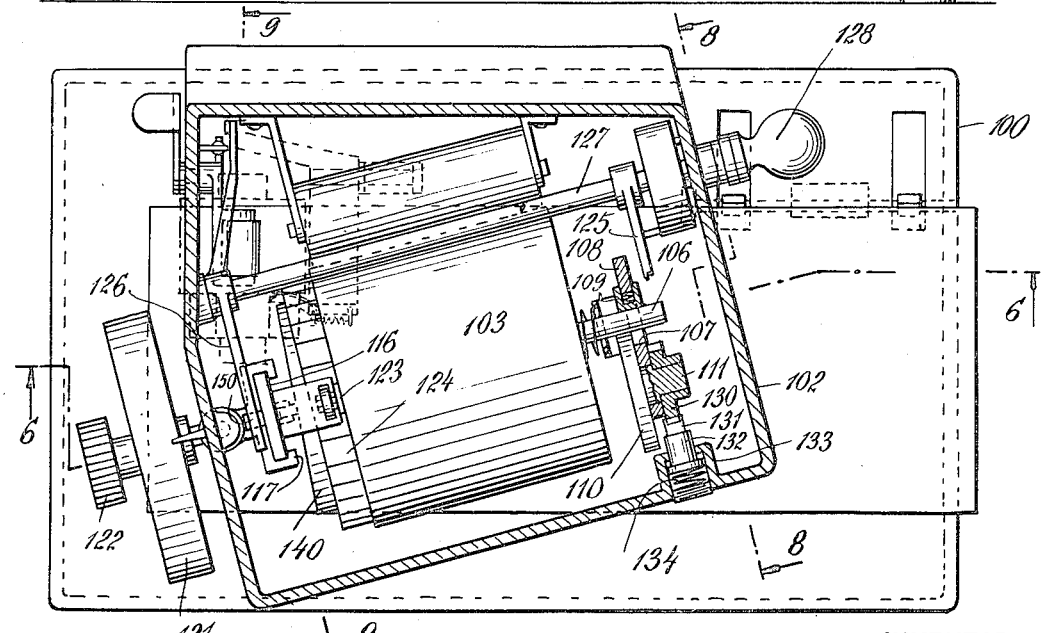
Fig. 7 is a top plan view partly in section illustrating the construction shown in Fig. 6.

The form of the invention illustrated in Figs. 6 to 10 inclusive will now be described. In this form of the invention the base 100 is provided with a supporting surface 101 for the check. A casing 102 is secured to the base and has mounted therein an impression device. The impression device in this instance comprises a roll 103 having indicia 104 thereon and the roll is mounted on a shaft 105. The shaft 105 has one end 106 disposed in a slot 107 formed in a plate 108, the shaft being engaged by a spring 109 and normally retained in contact with a cam 110 carried by a shaft 111 and the shaft 111 is rotatably mounted in the plate 108. The other end 115 of the shaft 105 is mounted in and extends through a plate 116 slidable in lugs 117 formed on a barrel 118 vertically pivoted at 119 in one wall of the casing 102. The shaft 115 extends outwardly through a slot 120 in the barrel and has secured to its outer end a disk 121 and handle 122 similar to corresponding parts described in connection with the other form of the invention. A spring-pressed roller 123 engages a notched disk 124 and retains the impression roll 103 in adjusted position.

The plates 108 and 116 are supported respectively by pin and slot connections from arms 125 and 126. These arms are secured to a shaft 127 having an operating handle 128 on one end thereof.

The angular movement of the impression device and of the shaft 105 thereof upon successive actuations of the device is accomplished by providing means for rotating the cam 110 upon each actuation of the impression device. This means comprises a ratchet wheel 130 secured to the shaft 111 and engaged by a pawl 131 carried by a stud 132 mounted in an extension 133 of the casing 102. A spring 134 forces the pawl toward the ratchet wheel. It will be seen that as the shaft 127 is rotated the arms 125 and 126 will lower the plates 108 and 116 and as the plate 108 is lowered carrying with it the shaft 111, the ratchet 113 and cam 110, the shaft will be rotated by reason of the engagement between the ratchet wheel and pawl 131. Rotation of the shaft will also cause rotation of the cam 110 and as the cam rotates the shaft 105 of the impression roll will be angularly displaced in the slot 107 of the plate 108.

Means is also provided in connection with this embodiment of the invention for longitudinally displacing the impression roll each time the roll is set. This is accomplished in the following manner. A cam 140 is secured to one end of the roll 103 and is engaged by a roll 141 carried by the plate 116. A spring 142 is interposed between the opposite end of the roll and the plate 108 and presses the cam 140 against the roller 141. It will be evident that as the roll 103 is rotated to the desired position of adjustment, the cam 140 will cause the roll and shaft to move longitudinally.

It will thus be seen that in the second embodiment of the invention described, means has been provided for longitudinally, as well as angularly, displacing the roll, thereby rendering it even more difficult to superimpose a new impression upon a check in the same location as an impression which has already been made thereon since an attempt to superimpose a new impression will necessitate rotating the roll and the new impression will be longitudinally, as well as angularly, displaced from the original impression.

The check feeding mechanism illustrated in the embodiment of the invention shown in Figs. 6 to 10 inclusive is similar to that described in connection with the other form of the invention and differs therefrom only in the fact that the lever 126 corresponding to lever 79 is actuated in this instance by a pin and slot connection 150 to the plate 116.

From the foregoing specification it will be seen that simple, practical and effective means has been designed for controlling the location of successive impressions on a check in such a manner as to render practically impossible the superimposing upon the location of an impression that has already been made a new impression.

Although certain specific embodiments of the invention have been particularly shown and described, it will be understood that the invention is capable of further modification and that further changes in the construction and in the arrangement of the various cooperating parts may be made without departing from the spirit or scope of the invention as expressed in the following claims.

What I claim is:

1. A check writer comprising a support for a check, an impression device movable to impress on the check the amount thereof and means for effecting relative angular movement between the impression device and the check upon each actuation of said device for changing the direction of the line of printing.

2. A check writer comprising a support for a check, an impression device movable to impress on the check the amount thereof and means operable upon each actuation of the device for angularly displacing the impression device through an indeterminate angle.

3. A check writer comprising a support for a check, an impression device movable to impress on the check the amount thereof and means operable upon each actuation of the device for irregularly displacing the axis of the impression device for changing the direction of the line of printing.

4. A check writer comprising a support for a check, an impression device movable to impress on the check the amount thereof and means operable upon each actuation of the device for changing the angle between the axis of the impression device and the longitudinal axis of the check support for changing the direction of the line of printing.

5. A check writer comprising a support for a check, an impression device including a roll having indicia thereon for impressing on the check the amount thereof, and means for effecting relative angular movement between the impression roll and the check support the angle of displacement being indeterminate.

6. A check writer comprising a support for a check, an impression device including a roll having indicia thereon for impressing on the check the amount thereof, and means for effecting relative angular movement between the impression roll and the check support upon each actuation of the impression device, the angular movement being indeterminate.

7. A check writer comprising a support for a check, an impression device including a roll having indicia thereon for impressing on the check the amount thereof, and means operable upon each actuation of the device through an indeterminate angle for angularly displacing the impression device.

8. A check writer comprising a support for a check, an impression device including a roll having indicia thereon for impressing on the check the amount thereof, and means operable upon each actuation of the device for irregularly displacing the axis of the impression device.

9. A check writer comprising a support for a check, an impression device including a roll having indicia thereon for impressing on the check the amount thereof, and means operable upon each actuation of the device for changing the angle between the axis of impression device and the longitudinal axis of the check for changing the direction of the line of printing.

10. A check writer comprising a support for a check, an impression device including a roll having indicia thereon for impressing on the check the amount thereof, and means operable upon each actuation of the device for changing the angle between the axis of the impression device and the path of movement of the check for changing the direction of the line of printing.

11. A check writer comprising a support for a check, and an impression device including a roll movable downwardly into engagement with the check and having indicia thereon for impressing on the check the amount thereof and means operable upon each actuation of the impression device for effecting relative angular movement of the axis of the roll the angular movement being indeterminate.

12. A check writer comprising a support for a check, and an impression device including a roll movable downwardly into engagement with the check and having indicia thereon for impressing on the check the amount thereof and means operable upon each downward movement of the impression device for effecting indeterminate relative angular movement of the axis of the roll.

13. A check writer comprising a support for a check, and an impression device including a yoke and a roll mounted in said yoke and having indicia thereon for writing on the check the amount thereof, and means for angularly displacing said yoke through an indeterminate angle upon each action of the impression device.

14. A check writer comprising a support for a check, an impression device including a roll having indicia thereon for impressing on the check the amount thereof, and means for effecting indeterminate relative longitudinal movement between the impression roll and the check support.

15. A check writer comprising a support for a check, a rotatable impression device movable toward said support, and means including a cam of irregular contour for effecting relative longitudinal movement between said device and said check upon the rotation of said device.

16. A check writer comprising a support for a check, a rotatable impression device movable toward said support, means for effecting indeterminate relative longitudinal movement between said device and said check upon the rotation of said device and means for effecting indeterminate relative angular movement between said device and said check upon each movement of the device toward the check support.

17. A check writer comprising a support for a check, an impression device including a roll having indicia on the periphery thereof and rotatable to bring any desired indicia to operative position above said support and means operable upon the rotation of the roll for shifting the roll irregularly longitudinally with reference to the check support.

18. A check writer comprising a support for a check, an impression device including a roll movable toward said support and having indicia on the periphery thereof and rotatable to bring any desired indicia to operative position above said support, means operable upon the rotation of the roll for shifting the roll irregularly longitudinally with reference to the check support, and means operable upon each actuation of said roll toward said check support for angularly adjusting the roll axis through an indeterminate angle.

19. A check writer comprising a support for a check, an impression device including a roll movable toward said support and means for effecting relative angular movement of the roll axis with reference to and in a plane parallel to the support upon each actuation of the roll toward the support said means being constructed and arranged to effect the movement of the roll axis through different angles upon successive actuations of the roll toward the support.

20. A check writer comprising a support for a check, an impression device including a roll movable toward said support and means operable upon each actuation of the roll for effecting relative angular movement of the roll axis through an indeterminate angle with reference to and in a plane parallel to the support upon each actuation of the roll toward the support.

21. A check writer comprising a support for a check, a roll mounted above said support and having a plurality of different indicia on the periphery thereof and means operable, upon rotation of the roll to set the roll in any desired position, to shift the roll longitudinally an indeterminate amount.

22. A check writer comprising a support for a check, a roll mounted above said support and having different indicia on the surface thereof, said roll being rotatable to bring any one of said indicia to operative position above the support and means, operable upon each adjustment of the roll to change the location of the indicia with respect to the support, to shift the roll with reference to the support an indeterminate amount.

23. A check writer comprising a support for a check, a roll mounted above said support and having different indicia on the surface thereof, said roll being rotatable to bring any one of said indicia to operative position above the support and means, operable upon each adjustment of the roll to change the location of the indicia with respect to the support, to shift the roll longitudinally an indeterminate amount with reference to the support.

24. A check writer comprising a support for a check, a roller mounted above said support and having different indicia on the surface thereof, said roll being rotatable to bring any one of said indicia to operative position above the support and means, operable upon each adjustment of the roll to change the location of the indicia with respect to the support, to shift the roll axis longitudinally an indeterminate amount with reference to the support in a plane parallel thereto.

25. A check writer comprising a check support, an impression device movable to impress on the check the amount thereof and means operable upon each actuation of said device to so displace said device that no two successive impressions made thereby will be parallel.

26. A check writer comprising a check support, an impression device movable to impress on the check the amount thereof and means operable upon each actuation of said device to so displace said device that successive impressions made thereby will be irregularly spaced from each other.

27. A check writer comprising a support for a check, an impression device movable to impress on the check the amount thereof and means including a cam operable upon each actuation of the device for irregularly displacing the axis of the impression device.

In witness whereof, I have hereunto set my hand this 14th day of November, 1922.

HARRY T. SCHERMERHORN.